Feb. 18, 1969  G. F. VORNDRAN  3,428,185
APPARATUS FOR STORING AND DISPENSING STACKED ARTICLES
Filed Nov. 10, 1966  Sheet 7 of 8

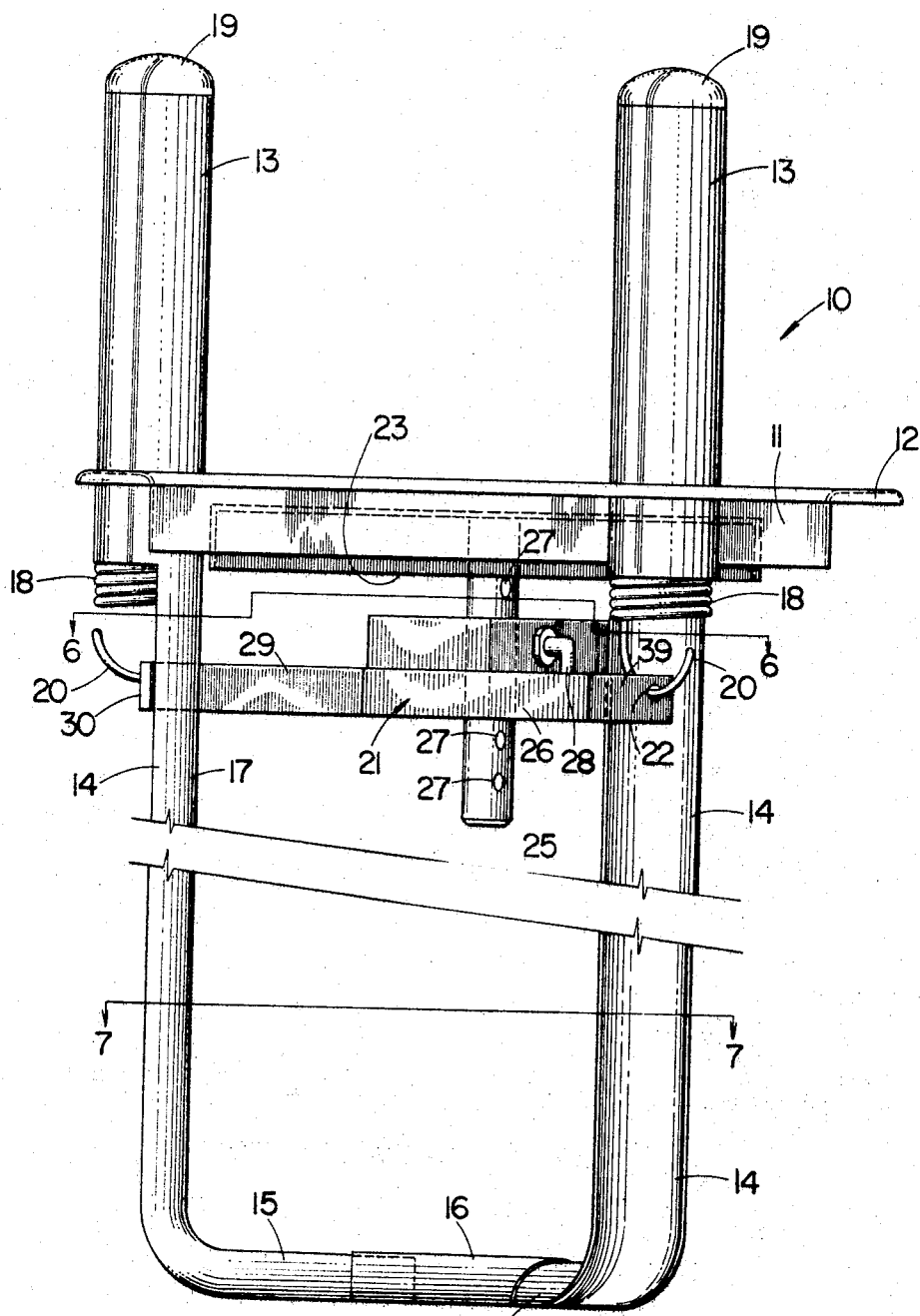

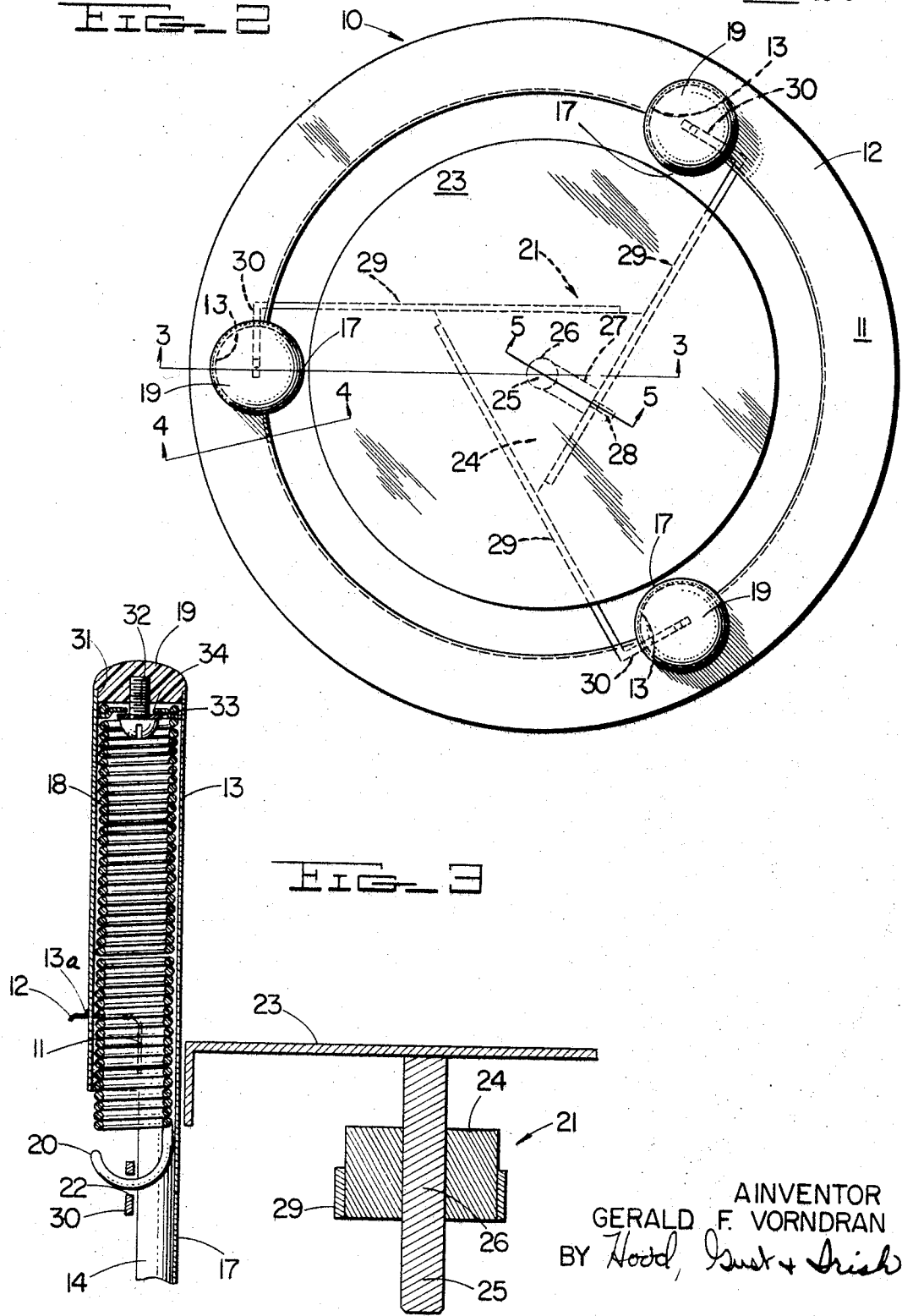

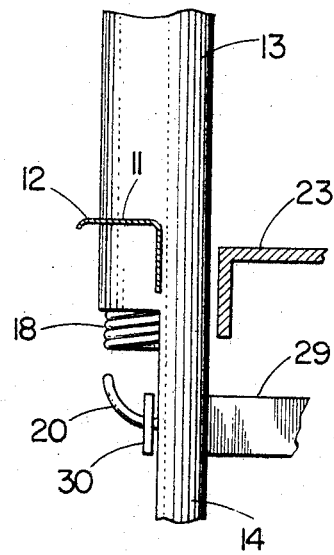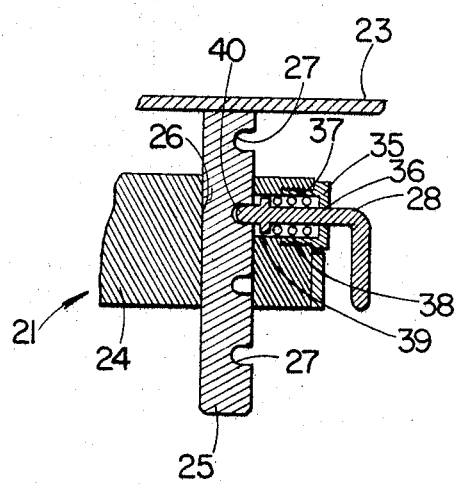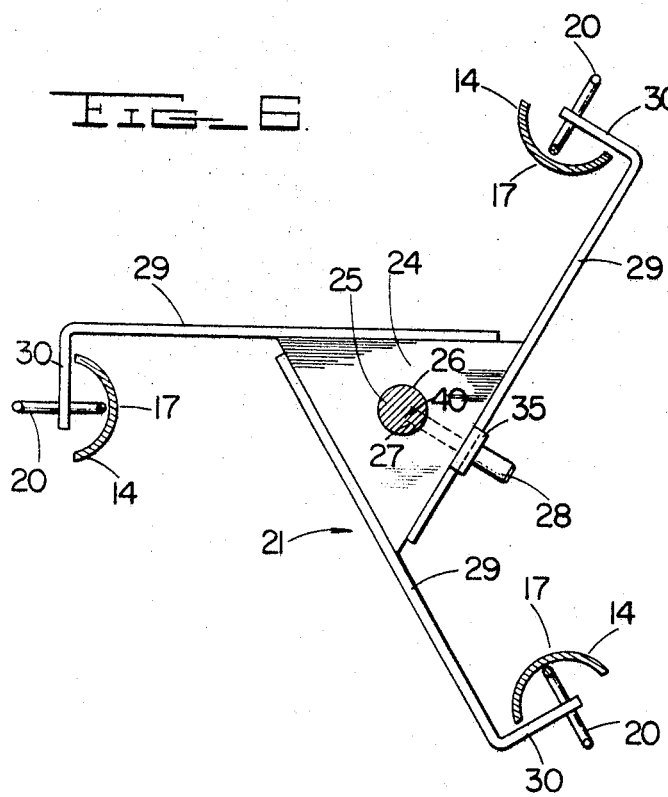

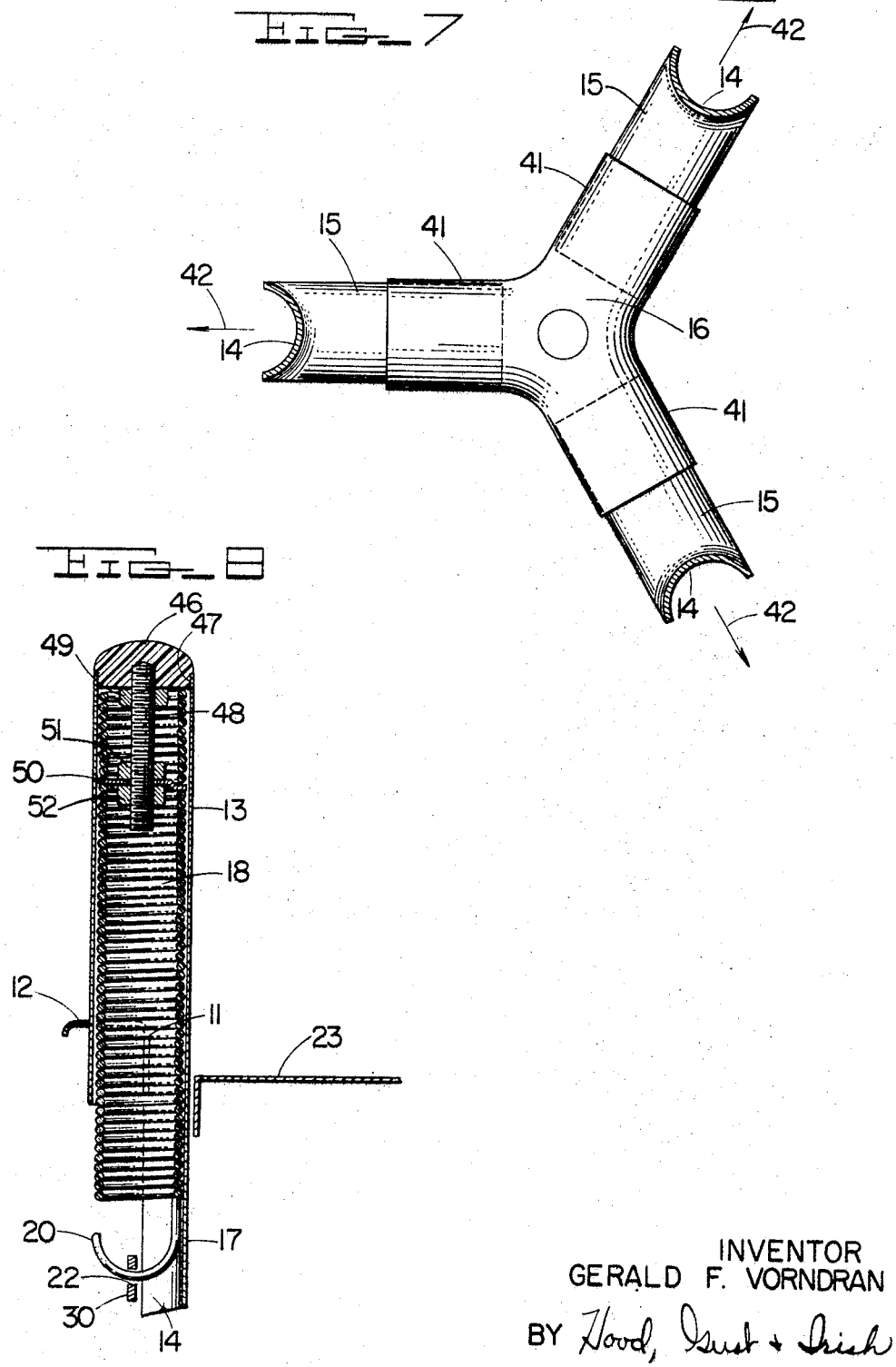

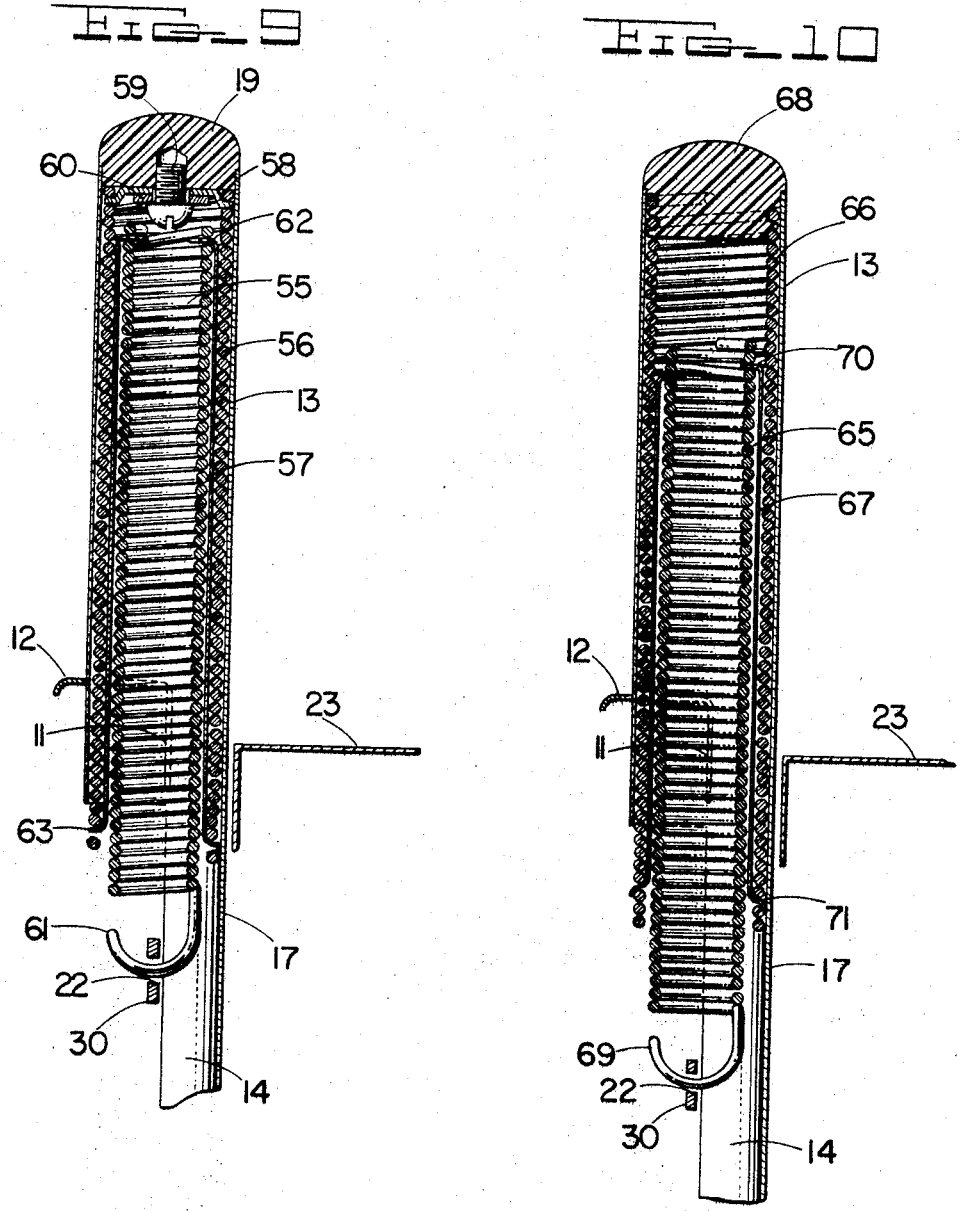

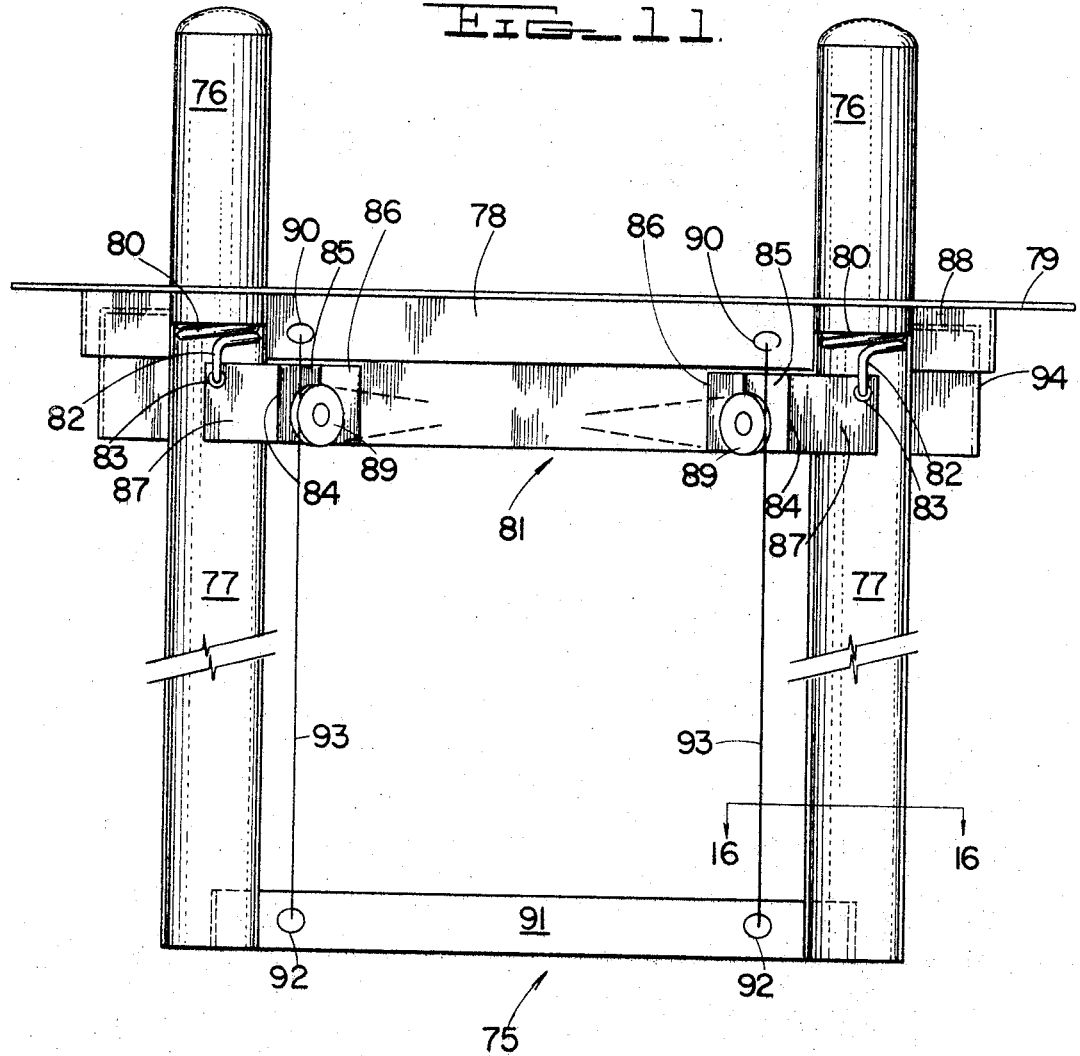

INVENTOR
GERALD F. VORNDRAN
BY Wood, Herst + Irish
ATTORNEYS

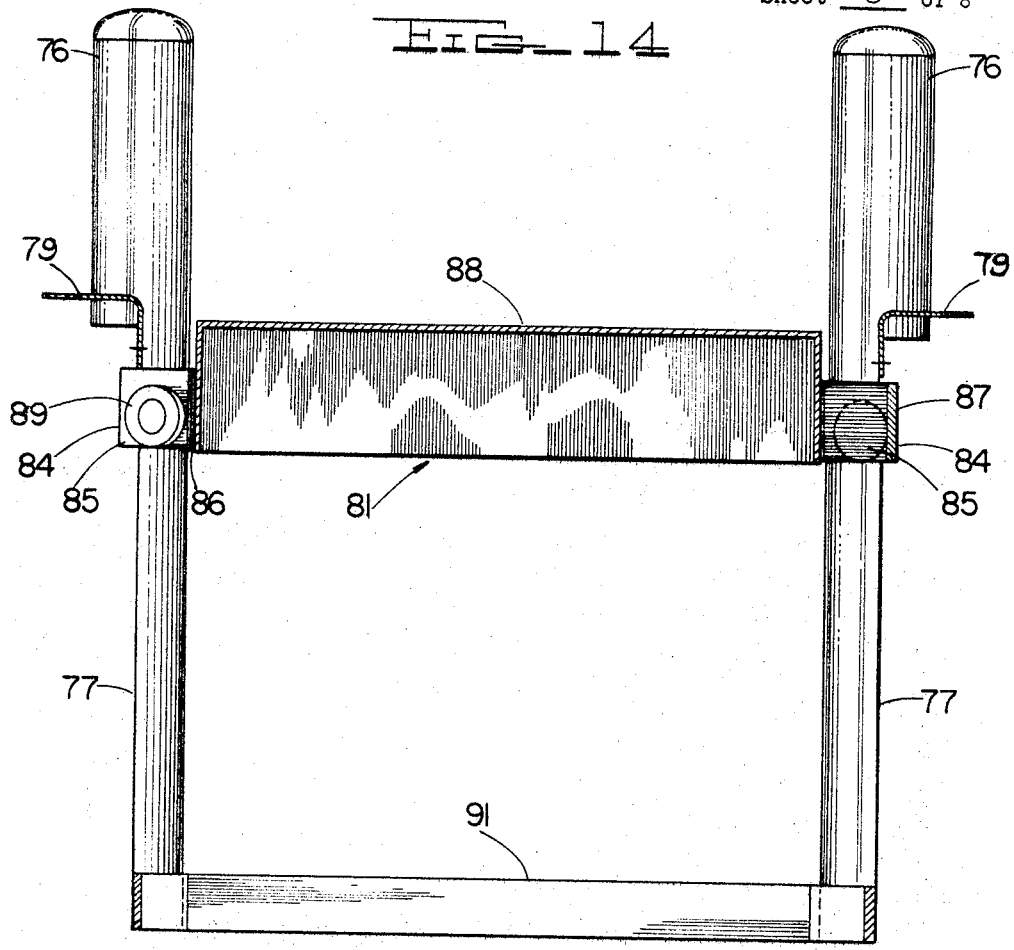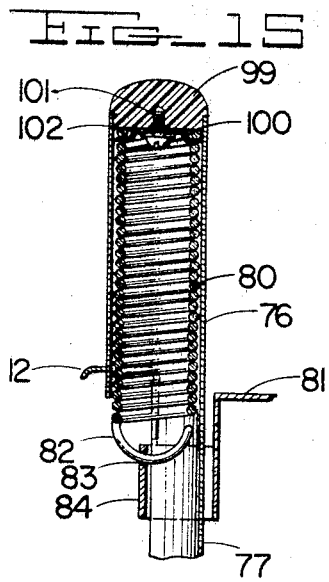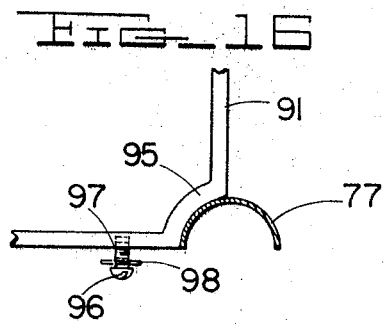

3,428,185
APPARATUS FOR STORING AND DISPENSING
STACKED ARTICLES
Gerald F. Vorndran, R.R. 4, Hartford City, Ind. 47348
Filed Nov. 10, 1966, Ser. No. 593,391
U.S. Cl. 211—49      14 Claims
Int. Cl. B65g 1/06; A47f 3/022; A47b 9/02

ABSTRACT OF THE DISCLOSURE

Apparatus for storing and dispensing stacked articles, such as dishes, including a plurality of vertically standing, hollow, post members arranged around the inner edge of a closed frame and secured thereto. Each of the post members has a transversely cut-away portion extending downwardly from the frame which terminates in a horizontally and radially inwardly extending base portion, the base portions of all of the post members being connected together to provide a rigid structure. Springs are disposed inside of each of the hollow post members with its lowermost portion extending into the respective cut-away portion, the uppermost portion of each of the springs being connected to the uppermost portion of the respective post member. The lowermost portions of the springs are connected to a bracket which is disposed between the post members. A platform is arranged for vertical movement in the space defined between the post members, the platform being vertically adjustably mounted on the bracket.

---

This invention relates generally to apparatus for storing and dispensing stacked articles, and more particularly to an apparatus for storing and dispensing stacked articles such as dishes, trays, cups, saucers, and the like. The storing and dispensing apparatus of the present invention is attractive for the use intended as compared to contemporary storing and dispensing apparatus because more effective and efficient use of storage space is made, means are provided for adjusting the dispensing height of articles loaded thereon, and means are provided for maintaining the dispensing platform level.

Storing and dispensing apparatus are well known and are utilized in cafeterias and restaurants for dispensing dishes, cups, saucers, trays and the like. The most common of such storing and dispensing apparatus is of the tube type, i.e., the apparatus is contained within a tubular enclosure extending downwardly through an opening in a countertop or the upper wall of a cabinet. A dispensing platform is arranged for vertical movement within the tubular enclosure and is biased upwardly by a relatively large helical spring positioned beneath the dispensing platform. Usually one end of the helical spring is connected to the dispensing platform and the other end of the spring is connected to the floor of the cabinet containing the storing and dispensing apparatus. Loading of articles on the dispensing platform causes the helical spring to be compressed an amount determined by the spring rate of the spring and the weight of the articles loaded on the platform. Preferably, the spring is compressed a distance equal to the increased height of the stack of articles on the platform. Conversely, the spring expands vertically upward a distance equal to the thickness of the articles removed therefrom. A predetermined length of chain is usually connected between the bottom of the dispensing platform and the floor of the cabinet to establish the no-load position of the dispensing platform.

Contemporary storing and dispensing apparatus, such as described above, have several inherent disadvantages. One disadvantage is that the spring means for urging the dispensing platform upwardly is disposed between the dispensing platform and the floor of the cabinet containing the storing and dispensing apparatus. Consequently, the spring means occupies space which could be used to store additional articles to be dispensed. Another disadvantage is that the aforementioned chain tends to become tangled with the spring means thereby preventing the dispensing platform from raising to the desired no-load position. A further disadvantage is that a single helical spring has a tendency to rotate as it is displaced vertically thereby causing the dispensing platform frictionally to engage the sides of the tube or other means guiding the platform upwardly. Consequently, calibration of the spring is difficult to obtain. Still another disadvantage is that the dispensing platform may cock due to the articles being located off-center of the dispensing platform. Obviously, cocking of the dispensing platform may cause the articles supported thereon ultimately to slide off the dispensing platform. A further disadvantage of contemporary storing and dispensing apparatus is that they are difficult to sanitize. Specifically, contemporary storing and dispensing apparatus are difficult to disassemble, and disassembly is required in order to meet the sanitary requirements of restaurants and cafeterias.

The storing and dispensing apparatus, or device, of the present invention has none of the above-mentioned disadvantages, but has many additional advantages. For instance, the device of the present invention can be fabricated at a cost competitive with contemporary storing and dispensing devices. In addition, the device of the present invention is easy to install and use. An attractive advantage of the device of the present invention, as disclosed herein, is that many of the components thereof are interchangeable and, by changing very few parts, smaller and larger devices may be made.

It is an object of the present invention, therefore, to provide an improved apparatus for storing and dispensing stacked articles.

Another object of the present invention is to provide an improved dish dispensing apparatus.

Still another object of the present invention is to provide a storing and dispensing apparatus having an energy storing means substantially positioned above the dispensing platform, thereby making more efficient and effective use of available storage space beneath the dispensing platform.

Another object of the present invention is to provide an article storing and dispensing apparatus which may be more easily cleaned than contemporary apparatus.

Still another object of the present invention is to provide an article storing and dispensing apparatus including means for adjusting the effective tensile properties of the energy storage means, thereby permitting the article storing and dispensing apparatus to handle articles of different weight.

A further object of the present invention is to provide an article storing and dispensing apparatus including means for varying the dispensing height of the articles to be dispensed.

Still a further object of the present invention is to provide an article storing and dispensing apparatus including a combination guide and support means that is light weight and comprised of few parts, thereby facilitating removal of the storing and dispensing apparatus from a cabinet or the like for cleaning and/or storage.

Yet another object of the present invention is to provide an article storing and dispensing apparatus in which the weight of the articles stored thereon is carried by the storing and dispensing apparatus and not by the top wall of a cabinet containing said apparatus.

Yet another object of the present invention is to provide an article storing and dispensing apparatus which occupies a minimum amount of space in a cabinet or the like.

Still another object of the present invention is to provide an article storing and dispensing apparatus which is characterized by its simplicity of construction.

A further object of the present invention is to provide an article storing and dispensing apparatus which is entirely self-contained and does not require special construction of a cabinet or the like which may be used to house the article storing and dispensing apparatus.

Another object of the present invention is to provide an article storing and dispensing apparatus which can be fabricated at a cost competitive to that of contemporary apparatus.

Still another object of the present invention is to provide a storing and dispensing apparatus including means for maintaining the dispensing platform level regardless of whether articles are loaded off-center of the dispensing platform.

A final object of the present invention is to provide an article storing and dispensing device which is efficient in operation and effective for its intended purpose.

Further objects and advantages of the present invention will become apparent by reference to the following description and the accompanying drawings, and the features of novelty which characterize the invention will be pointed out with particularity in the claims annexed to and forming a part of this specification.

In the drawings:

FIGURE 1 is a side view of one embodiment of the article storing and dispensing device of the present invention illustrating the several components thereof and their relative position with respect to each other in an unloaded position;

FIGURE 2 is a top view of the embodiment shown in FIGURE 1 illustrating the equal-spaced positioning of the hollow post members around the inner periphery of an annular frame and also illustrating a means for supporting the platform means;

FIGURE 3 is a fragmentary cross-sectional view taken from FIGURE 2 generally along the lines 3—3, illustrating the arrangement of energy storage means within the hollow post members and the spacing between the hollow post members and the platform means;

FIGURE 4 is a fragmentary cross-sectional view taken from FIGURE 2 generally along the lines 4—4, illustrating the connection between the energy storage means and a bracket means supporting the platform means;

FIGURE 5 is a fragmentary cross-sectional view taken from FIGURE 2 generally along the lines 5—5, illustrating an adjustable means for varying the height of the platform means on the aforementioned bracket means;

FIGURE 6 is a cross-sectional view taken from FIGURE 1 generally along the lines 6—6, illustrating the aforementioned bracket means and the method for connecting said bracket means to the aforementioned energy storage means;

FIGURE 7 is a cross-sectional view taken from FIGURE 1 generally along the lines 7—7, illustrating a means for connecting the post members together so as to form a rigid structure for the storing device;

FIGURE 8 is a fragmentary cross-sectional view showing a modification of the invention including means for adjusting the effective spring rate of a spring means, thereby adapting the storing and dispensing device to handle articles of different weight;

FIGURE 9 is a fragmentary cross-sectional view showing a modified form of spring means which facilitates handling heavier than normal loads;

FIGURE 10 is a cross-sectional view of another modified form of spring means similar to that illustrated in FIGURE 9 wherein the effective spring rate of the spring means has been reduced by reducing the number of active coils;

FIGURE 11 is a side view of another embodiment of the present invention illustrating a means for maintaining the dispensing platform level regardless of whether articles are evenly loaded on said dispensing platform;

FIGURE 14 is a cross-sectional view taken from FIGURE 12 generally along the lines 14—14;

FIGURE 15 is a fragmentary cross-sectional view taken from FIGURE 12 generally along the lines 15—15; and FIGURE 16 is a fragmentary cross-sectional view taken from FIGURE 11 generally along the lines 16—16.

Figure 13:
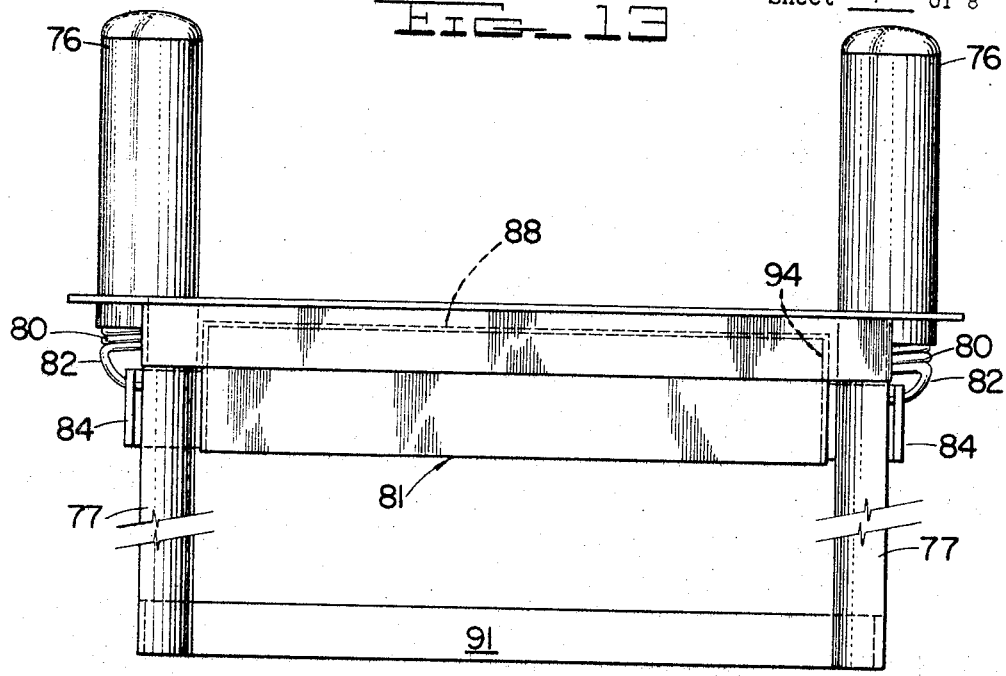
FIGURE 13 is an end view of the embodiment illustrated in FIGURE 11.

Generally speaking, the present invention is an apparatus for storing and dispensing stacked articles and comprises a plurality of vertically standing hollow post members arranged about the inner edge of a closed frame and secured thereto. Each of the post members have a portion extending downwardly from the frame and terminating in a base portion. There is a means for connecting each of the base portions so as to provide a rigid structure comprising the frame and the post members. An energy storage means is disposed inside of each of said hollow post members. Means are provided for connecting an uppermost portion of each of the energy storage means to an uppermost portion of its associated post members and second means are provided for connecting a lowermost portion of each of the energy storage means to a platform means. The platform means is arranged for vertical movement guided by the post members. Each of the energy storage means has substantially equal tensile properties for yieldably supporting the platform means for vertical movement while maintaining the platform substantially level. The vertical position of the platform means is determined by the tensile properties of all of the energy storage means and the weight of articles loaded thereon.

Referring now to FIGS. 1 through 7 of the accompanying drawings, the structure of one embodiment of the present invention can be visualized in conjunction with the following description.

The first illustrative embodiment of the present invention, indicated generally by the reference number 10, comprises an annular adaptor ring or frame 11 having a flat flange portion 12. The adaptor frame 11 is provided to laterally support the uppermost portion of the storing and dispensing device 10 in an opening in the top surface of a cabinet or the like. There are a plurality of hollow post members 13 preferably equally spaced on the inner edge of the frame 11 and secured thereto, as by welding at 13a, as is shown clearly in FIG. 3. It will be readily understood that equal spacing of the post members 13 is not required.

In FIG. 1, it can be readily seen that each of the hollow post members 13 is partially cut-away at a point just below the bottom of the frame 11 so as to provide a downwardly extending, outwardly facing, concave guide and support element 14. Each of the guide and support elements 14 is formed so as to have a radially inwardly extending base portion 15. The base portions 15 are connected together as shown in FIG. 7 to provide a rigid structure comprised of the frame 11, post members 13 and guide and support elements 14. It can be seen that in the illustrative embodiment 10, the post members 13 and guide and support elements 14 are integrally formed out of tubular members. The guide and support elements 14 are therefore, essentially a transverse one half of the extended hollow post members 13. It can also be seen that inner surfaces 17 of the guide and support elements 14 and the hollow post members 13 provide a guide for directing the vertical movement of the platform means of the storage and dispensing device 10.

The structural strength of the guide and support elements 14, formed in the manner shown in FIG. 1, is sufficient, if desired, to support the storing and dispensing device 10 and articles loaded thereon on the bottom surface of a cabinet, without requiring a portion of the overall load to be supported by the top surface of the cabinet receiving the frame 11.

There is an energy storage means, shown as a coil spring 18, disposed within each hollow post member 13 as is shown in FIGS. 1 and 3. The uppermost portion of the spring 18 is connected to the inside of a cap 19 on the upper end of each hollow post member 13. Specific means for connecting the spring 18 to the caps 19 are shown in FIGS. 3 and 8.

The lowermost portions of the spring 18 terminates in a loop 20. A support bracket, indicated generally by the reference number 21, is supported by each of the loops 20 of the spring 18. That is, the loops 20 extend through holes 22 in arms 29 of the support bracket, as best seen in FIGS. 1, 3 and 6. In FIG. 6 it can be seen that the bracket 21 has a triangular central member 24 and that the arms 29 are secured to the sides thereof and extend outwardly toward each post member 13. An extension 30 is formed on the end of each of the arms 29 so as to extend under the cut-away portion of the post member 13 and on the outer side of the respective support element 14. The hole 22 for receiving the spring loop 20 is disposed in the extension 30.

A platform 23 is mounted on the support bracket 21 by vertically adjustable means comprised of a shaft 25 which is connected to a central portion of the platform 23 and which extends through a vertical hole 26 in the control member 24 of the support bracket 21. It can be seen in FIGS. 1 and 5 that there are transaxial sockets 27 in the shaft 25 for receiving a pin 28 which is movable in the bracket 21. Referring now to FIG. 5, it can be seen that an insert 35 having an axial hole 36 is threaded into a hole 37 in the central member 24 of the bracket 21. The pin 28 is disposed in the hole 36 as is clearly shown in FIG. 5. There is a spring 38 disposed about the pin 28 and held between a shoulder 39 on the pin 28 and the back interior surface of the insert 35 so as to urge an end portion 40 of the pin 28 into selective engagement with the transaxial holes 27 in the shaft 25. Therefore, whenever the pin 28 is pulled in opposition to the compressive force of the spring 38 so as to disengage the end portion 40 from the holes 27 in the shaft 25, the shaft 25 may be moved with respect to the bracket means so as selectively to adjust the vertical position of the platform 23.

It can be seen that the embodiment shown in FIGS. 1 through 7 has three hollow post members 13 equally and radially spaced about the inner edge of the frame 11. It has been found that three equally and radially spaced post members, like the hollow post members 13, are ideally suited for the guiding and supporting functions discussed in this description, however, it will be readily understood that more than three may be employed.

In FIG. 3, it can be seen that the caps 19 have an undercut portion 31 which fits down into the hollow post members 13. A screw 32 is threaded up into the bottom surface of the cap 19. A first washer 33 is disposed on the screw 32 so as to hold a larger washer 34, which engages coils of the spring 18. It can be seen, therefore, that the spring 18 is suspended from the cap 19 which is pressed into the hollow post member 13. The embodiment shown in FIG. 3 has been found to be a simple way of resiliently supporting the platform 23 within the storing and dispensing device 10. Other means for resiliently supporting the dispensing platform 23 will be shown and discussed in conjunction with FIGS. 8, 9 and 10.

Referring now to FIG. 7, a connector 16 for interconnecting the base portions 15 of the support and guide means will be described. The connector 16 comprises three equally and radially spaced sleeves 41 which receive the base portions 15 and are secured thereto, as by welding. During assembly of the device 10, the sleeves 41 are adapted to fit down over the base portions 15, as is shown in FIG. 1, to permit movement of the base portions 15 in the directions of the arrows 42 shown in FIG. 7. Thus, it can be seen that the connector 16 may be used with different storing and dispensing devices 10 merely by moving the base portions 15 in and out with respect to the sleeves 41. Of course, different size frames 11 and dispensing platforms 23 would have to be used to obtain different sizes of storing and dispensing devices 10.

Looking further at FIG. 1, it can be seen that when articles, such as plates, are loaded onto the platform 23 the spring means 18 is extended downwardly by the weight of the articles on the platform. The downward motion of the platform 23 is guided by the inner surfaces 17 of the guide and support elements 14. The distance which the platform 23 is moved downward, of course, depends on the weight placed thereon. That is, the spring rate of each of the springs 18 equally determines the downward movement of the platform 23. It is preferable for all of the springs 18 to have substantially equal spring rates so as to maintain the platform 23 level during vertical movement. The vertical position of the platform depends, of course, on the spring rates of the springs 18 and the weight of articles loaded on the platform 23.

The embodiment shown in FIGS. 1 through 7 and discussed in conjunction therewith, is ideally suited for storing plates and the like. The various components of the embodiment, such as the post members 13 and frame 11, bracket means 21, and platform 23 can be easily removed from the total system and cleaned. The post members 13 having the downwardly extending guide and support elements 14 integrally formed thereon, can be used with a wide variety of sizes of frames 11. That is, with the connector 16 for connecting the guide and support means 14, various sizes of the frame 11 may be used in combination therewith.

Referring now to FIG. 8, a modified means for connecting a spring means to an uppermost portion of the hollow post member 13 will be described. A cap 46 having an under-cut portion 47 received in the hollow post member 13 is arranged so that it may be rotated therein. A stud 48 is threaded up into the bottom surface of the cap 46 and is securely held there by means of a lock nut 49 which is threaded on the stud 48 and tightly held against the cap 46. A washer 50 for threadably engaging the coils of the spring 18 is mounted on the stud 48 and securely held in position by means of lock nuts 51 and 52 disposed on each side thereof. It can be seen, therefore, that rotation of the cap 46 and, consequently, the stud 48 will cause the washer 50 to thread more or less coils above the washer 50. In this manner, the effective spring rate of the spring 18 may be changed to accommodate different loads placed on the platform 23. Specifically, by threading more coils above the washer 50, greater weight can be placed on the platform 23. The position of the washer 50 may be adjusted by loosening the lock nuts 51 and 52 and by placing the washer at a desired point along the stud 48 and then tightening the lock nuts 51 and 52. The means illustrated in FIG. 8 may be used in combination with the embodiment shown in FIG. 1 through FIG. 7 and the embodiment shown in FIGS. 11 through 16 to calibrate the spring rate of each of the springs disposed in the hollow post member of said embodiments. That is, the spring rate of each of the springs 18 disposed in the hollow post members 13 may be made equal by the means illustrated in FIG. 8 so as to maintain the platform 23 level.

Referring now to FIG. 9, another embodiment of spring means which may be disposed within the hollow post members of the present invention will be described. The spring means illustrated in FIG. 9 comprises a plurality of helically coiled springs telescopically disposed in the hollow post member 13 for expansion and contraction therealong. Specifically, there is a first or inner coil spring 55 disposed inside of the second or outer coil spring 56 and a rigid sleeve 57 for connecting the uppermost portion of said inner spring to the lowermost portion of said outer spring. The uppermost portion of the outer spring 56 is connected to the cap 19 by means of a washer 58 which threadably engages coils of the outer spring 56. The washer 58 is secured to the cap 19 by means of a screw 59, which threads into the cap 19, and a smaller washer 60 disposed on the screw 59. The lowermost portion of the inner spring 55 terminates in a hook 61 which extends through the hole 22 in the extension 30 of the arm 29 of the bracket means 21 which supports the platform 23. Thus, whenever weight is loaded on the platform 23 a force is applied by the extension 30 to the inner spring 55 and through the sleeve 57 to the outer spring 56. The sleeve 57 has an inwardly extending flange portion 62 at its upper end for engaging the uppermost coils of the inner spring 55, and an outwardly extending flange 63 for engaging the lowermost coils of the outer spring 56.

The spring means illustrated in FIG. 9 is ideally suited for obtaining greater spring capability without sacrificing vertical space. This feature is desirable when heavier articles are to be loaded onto the storing and dispensing device of the present invention and heavier spring wire or a single spring would consume an undesirable amount of space.

Referring now to FIG. 10, a spring means similar to the spring means of FIG. 9, but arranged to provide a variable spring rate will be described. There is an inner coil spring 65 disposed within an outer coil spring 66 and a sleeve 67 for connecting the lowermost portion of the outer spring 66 to the uppermost portion of the inner spring 65. It can be seen that the uppermost coils of the outer spring 66 are threaded onto a threaded portion of cap 68, thereby securing the uppermost portion of the outer spring to the uppermost portion of the hollow post member 13. The lowermost portion of the inner spring 65 terminates in a hook 69 which extends through the hole 22 in the extension 30 as discussed previously. The sleeve 67 has an inwardly extending flange 70 at its upper end for engaging the upper-most coils of the inner spring 65 and an outwardly extending flange 71 at its lower end for engaging the lowermost coils of the outer spring 66. The coils of the springs 65, 66 are oppositely wound so that rotation of the sleeve 67 changes the combined spring rate of the springs 65, 66. Specifically, rotation of the sleeve 67 in one direction will cause more coils of the outer spring 66 to be threaded to the underside of the lower flange 71 of the sleeve 67 and more coils of the inner spring 65 to be threaded to the upper side of the flange 70 of the sleeve 67. Rotation of the sleeve 67 in the opposite direction will produce the opposite result. In this manner, the number of active coils of both springs and, consequently, the combined spring rate of both springs can be changed. The spring means of FIGS. 9 and 10 are equally applicable to the embodiments of FIGS. 1 through 7 and 11 through 16.

Referring now to FIGS. 11 through 16, another embodiment of the present invention will be described. The second illustrative embodiment of the present invention, indicated generally by the reference number 75, is characterized by the addition of a novel means for maintaining a vertically movable platform level regardless of whether articles are evenly loaded on said platform.

There are a plurality of hollow post members 76, similar to the post members 13, 14 of the previous embodiment, having guide and support elements 77 extending downwardly therefrom as discussed in conjunction with the first illustrative embodiment 10. The hollow post members 76 are secured to the inner edge of a frame 78 having a horizontally outwardly extending flange 79, as by welding. As was the case the flange 11 in the first illustrative embodiment, the frame 78 is a means for laterally supporting the storage and dispensing device 75 in an opening in the top surface of a cabinet or the like. There are coil springs 80 disposed inside each of the hollow post members 76 in the same manner as the coil spring 18 in the first illustrative embodiment 10. The lowermost portions of the springs 80 are connected to a platform indicated generally by the reference number 81. A specific means for connecting the lowermost portions of the springs 80 to the platform 81 is clearly shown in FIGS. 11, 13 and 15. It can be seen that the lowermost portion of each spring 80 terminates in a loop 82 which extends through a hole 83 in a bracket 84 extending from the platform 81.

In the second illustrative embodiment 75, the frame 78 is rectangular and a hollow post member 76 is disposed adjacent each of the four corners thereof. The platform 81, which includes a top plate or surface 88, is also generally rectangularly shaped and there are four brackets 84 connected thereto for receiving the loops 82 of the springs 80. The relationship of the post members 76, frame 78, and the bracket 84 is most clearly shown in FIG. 12.

Figure 12:
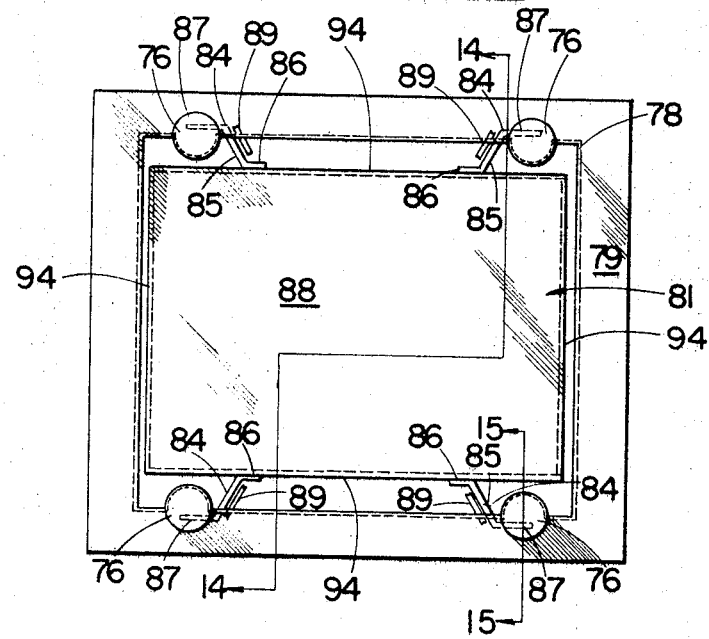
FIGURE 12 is a top view of the embodiment shown in FIGURE 11.

It can be seen in FIG. 12 that the brackets 84 are generally Z-shaped having a first extension 86 fastened to the platform 81 and a second extension 87 having the hole 83 therein for receiving the loop 82 of the spring 80. The central portions 85 of the brackets 84 extend outwardly from the platform 81 and toward the post members 76.

There is a pulley 89 rotatably mounted on the central portion 85 of each of the brackets 84 as is shown in FIGS. 11 and 12. Referring to FIG. 11, it can be seen that there is a cable 93 disposed about and cooperating with at least two of the pulleys 89. One end of each of the cables is connected to the frame 78 at the points 90 and the other end of each of the cables is connected to the base 91, which connects the lowermost portions of the guide and support means 77, at the points 92. In the second illustrative embodiment 75, the cables, represented by the reference 93, are disposed about pulleys 89 at diagonally opposite corners of the storing and dispensing device 75. The pulley and cable arrangement of the second embodiment is an ideal means for maintaining the platform means 81 level. That is, with each of the cables 93 disposed about and cooperating with at least two pulleys 89 on diagonally opposite corners of the platform means 81, one corner of the platform means cannot move up or down without the balance of the platform means moving a corresponding amount in the same direction.

The platform 81 is constructed so as to have a horizontal top surface 88 with downwardly extending side flanges 94. The side flanges 94 cooperate with the guide and support elements 77 to direct the vertical movement of the platform 81.

The base 91 shown in FIGS. 11, 13 and 14 is an illustrative means for connecting the guide and support means 77 of the hollow post members 76, at their lowermost portions so as to provide a rigid structure comprising the frame 78, the hollow post members 76 and the base 91. In FIG. 16, it can be seen that each of the guide and support elements 77 are disposed in a concave corner portion 95 of the base 91.

A means for connecting the cables 93 to the base 91 is also illustrated in FIG. 16. There is a screw 96 threaded into a hole 97 in the base 91. When the screw 96 is threaded into the hole 97 a washer 98 carried by the screw is held tightly against the surface of the base 91 so as to hold the cable 93 between the washer 98 and the base 91.

In FIG. 15, a means for connecting the uppermost portion of the spring 80 to the uppermost portion of the hollow post member 76 is illustrated. It can be seen that the means illustrated in FIG. 15 is similar to the means discussed in conjunction with the first embodiment. That is, there is a washer 100 for engaging the uppermost coils of the spring 80 and a screw 101 and washer 102 for holding the washer 100 to the cap 99.

The storing and dispensing devices described in this specification are ideally suited for use in restaurants, cafeterias and the like for storing and dispensing plates, cups, saucers and the like. Because of this potential use, the storing and dispensing devices discussed in this specification can be fabricated out of stainless steel to facilitate sanitary maintenance thereof. The hollow post members 13 and 76 could obviously be fabricated out of stainless steel tubes. The guide and support elements 14, 77 extending downwardly from the hollow post members can be formed merely by cutting away a portion of the tube as is shown in FIG. 1.

While I have illustrated and described a specific embodiment of my invention, further modifications and improvements will occur to those skilled in the art, and I desire therefore, in the appended claims, to cover all modifications which do not depart from the spirit and scope of my invention.

What is claimed is:

1. Apparatus for storing and dispensing stacked articles comprising, a plurality of vertically standing hollow post members arranged about the inner edge of a closed frame and secured thereto, each of said post members having a portion extending downwardly from said frame and terminating in a base portion, means for connecting each of said base portions thereby to provide a rigid structure comprising said frame and said post members, helically coiled springs respectively disposed in said hollow post members for expansion and contraction therein, means for connecting an uppermost portion of respective springs to an uppermost portion of said post members including a cap mounted on the top of each of said post members and arranged for rotation thereon, a stud extending downwardly from each of said caps inside of the respective spring and adapted to be rotated thereby, means threadably engaging coils of each of said springs, each of said engaging means being mounted on a respective stud whereby rotation thereof changes the spring rate of the respective spring, and means for connecting a lowermost portion of each of said springs to a platform means, said platform means being arranged for vertical movement within and guided by said post members.

2. The apparatus of claim 1 wherein said stud is threaded and said engaging means is movably mounted on said stud and secured in a selected position thereon by a stop nut disposed on each side thereof, said shaft being threaded into said cap and secured thereto by a stop nut.

3. Apparatus for storing and dispensing stacked articles comprising, a plurality of vertically standing hollow post members arranged about the inner edge of a closed frame and secured thereto, each of said post members having a portion extending downwardly from said frame and terminating in a base portion, means for connecting each of said base portions thereby to provide a rigid structure comprising said frame and said post members, a plurality of helically coiled springs telescopically disposed in each of said hollow post members for expansion and contraction therein, the first of said springs being disposed inside of the second of said springs, rigid sleeve means disposed between said springs for connecting the uppermost portion of said first spring to the lowermost portion of said second spring, means for connecting an uppermost portion of each second spring to an uppermost portion of its respective post member, means for connecting a lowermost portion of each first spring to a platform means, said platform means being arranged for vertical movement within and guided by said post members, each of said plurality of springs having substantially equal tensile properties for yieldably supporting said platform means for vertical movement while maintaining said platform substantially level, the vertical position of said platform means being determined by the tensile properties of all of said springs and the weight of articles loaded thereon.

4. The apparatus of claim 3 wherein said first and second springs are oppositely wound and wherein said sleeve means is threadably engaged with coils of said first and second springs so that rotation thereof changes the combined spring rate of said first and second springs.

5. Apparatus for storing and dispensing stacked articles comprising, a plurality of vertically standing hollow post members arranged about the inner edge of a closed frame and secured thereto, each of said post members having a portion extending downwardly from said frame and terminating in a base portion, means for connecting each of said base portions thereby to provide a rigid structure comprising said frame and said post members, energy storage means disposed inside each of said hollow post members, means for connecting an uppermost portion of each of said energy storage means to an uppermost portion of its respective post member, means for connecting a lowermost portion of each of said energy storage means to a platform means, said platform means being arranged for vertical movement within and guided by said post members, each of said energy storage means having substantially equal tensile properties for yieldably supporting said platform means for vertical movement while maintaining said platform substantially level, the vertical position of said platform means being determined by the tensile properties of all of said energy storage means and the weight of articles loaded thereon, a plurality of pulleys rotatably mounted on said platform means and a cable for each of said pulleys disposed about and cooperating with, at least, two of said pulleys to maintain said platform means level, said cables having one end connected to said frame and the other end connected to said means connecting the lowermost portions of said post members.

6. An apparatus for storing and dispensing stacked articles comprising, a plurality of vertically standing hollow post members arranged about the inner edge of a closed frame and secured thereto, each of said post members having a transversely cut-away portion extending downwardly from said frame and terminating in a horizontally and radially inwardly extending base portion, means for connecting each of said base portions thereby to provide a rigid structure comprising said frame and said post members, spring means disposed inside each of said hollow post members with its lowermost portion extending into the respective cut-away portion, means for connecting an uppermost portion of each of said spring means to an uppermost portion of its respective post members, means for connecting said lowermost portion of each of said spring means to a bracket means disposed between said post members, platform means arranged for vertical movement in the space defined by said post members, vertically adjustable means for mounting said platform means on said bracket means, each of said spring means having substantially equal tensile properties for yieldably supporting said platform means for vertical movement while maintaining said platform means substantially level, the vertical position of said platform means being determined by the tensile properties of all of said spring means and the weight of articles loaded thereon.

7. The apparatus of claim 6 wherein each of said cut-away portions has an outwardly facing concave surface for accommodating vertical movement for said lowermost portion of the respective spring means and an inwardly facing surface for guiding vertical movement of said platform means, and wherein said bracket means includes extension portions respectively disposed adjacent said outer surfaces of said cut-away portions, said lowermost portions of said spring means being respectively connected to said extension portions.

8. The apparatus of claim 6 wherein said frame is annular and said post members are evenly spaced therearound.

9. The apparatus of claim 8 wherein there are three equally and radially spaced post members, and said means for connecting each of said base portions of said post members includes a member having three equally spaced and radially outwardly extending sleeves each arranged to receive one of said base portions.

10. The apparatus of claim 6 wherein said vertically adjustable means comprises a substantially vertical shaft for supporting said platform means, said shaft being mounted in a substantially vertical hole in said bracket and having a plurality of spaced apart transaxial holes, a pin for selectively engaging said transaxial holes so as to determine the height of said platform means, said pin being slidably arranged on said bracket means, and spring means for urging said pin into engagement with one of said holes.

11. An apparatus for storing and dispensing stacked articles comprising, a plurality of vertically standing hollow post members arranged about the inner edge of a closed frame and secured thereto, each of said post members having a portion extending downwardly from said frame so as to provide support legs for said apparatus, means connecting the lowermost portions of each of said post members so as to provide a rigid structure comprising said frame and said post members, spring means disposed inside each of said hollow post members, means for connecting the uppermost portion of each of said spring means to an uppermost portion of its respective post member, means for connecting a lowermost portion of each of said spring means to a platform means, said platform means being arranged for vertical movement within and guided by said post members, each of said spring means having substantially equal tensile spring rates for yieldably supporting said platform means for vertical movement, the vertical position of said platform means being determined by the spring rate of all of said spring means and the weight of articles loaded thereon, means for maintaining said platform means substantially level during vertical movement comprising a plurality of pulleys rotatably mounted on said platform means, and a cable for each of said pulleys disposed about and cooperating with at least two of said pulleys, said cables having one end connected to said frame and the other end connected to said means connecting the lowermost portions of said post members.

12. The apparatus of claim 11 wherein said closed frame is rectangular, wherein there are four of said post members, each of said post members being arranged adjacent a corner of said frame, and wherein one of said pulleys is disposed adjacent each of said post members.

13. The apparatus of claim 12 wherein each of said cables is disposed about and cooperates with pulleys on opposite sides of said frame.

14. The apparatus of claim 12 wherein each of said cables is disposed about and cooperates with pulleys on diagonally opposite corners of said frame.

References Cited

UNITED STATES PATENTS

| | | | |
|---|---|---|---|
| 2,717,085 | 9/1955 | Waddington | 312—71 XR |
| 2,802,575 | 8/1957 | Harrison | 312—71 XR |
| 3,163,292 | 12/1964 | Shelley | 211—49 |
| 3,181,919 | 5/1965 | Shelley. | |
| 3,302,827 | 2/1967 | Maslow | 211—49 XR |
| 3,331,337 | 7/1967 | MacKay | 211—49 XR |

ROY D. FRAZIER, *Primary Examiner.*

U.S. Cl. X.R.
108—136; 312—71